June 13, 1967 R. C. STADDEN 3,325,574
METHOD OF MAKING INLAID PLASTIC SURFACE COVERING
Filed Oct. 23, 1956
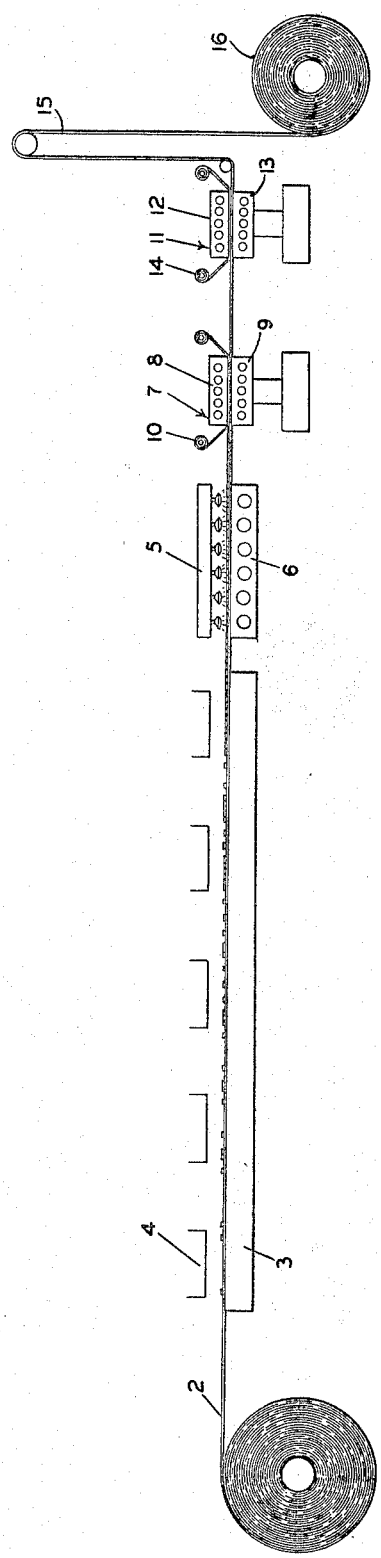
INVENTOR
RICHARD C. STADDEN
ATTORNEY United States Patent Office 3,325,574
Patented June 13, 1967

3,325,574
METHOD OF MAKING INLAID PLASTIC
SURFACE COVERING
Richard C. Stadden, Manor Township, Lancaster County,
Pa., assignor to Armstrong Cork Company, Lancaster,
Pa., a corporation of Pennsylvania
Filed Oct. 23, 1956, Ser. No. 617,761
12 Claims. (Cl. 264—73)

This invention relates to a method of making an inlaid plastic surface covering from granulated particles of a plasticized polymerized vinyl resin composition. The invention may be practiced using conventional molded inlaid linoleum manufacturing equipment.

Molded inlaid surface coverings are formed by depositing the granulated composition through stencil openings onto a backing layer of burlap, waterproofed felt, or other foundation, generally in web form. Inlays of different colors are applied to form a complete pattern on the backing, and the inlays are consolidated under heat and pressure to form a smooth surfaced sheet firmly anchored to the backing. The product is sometimes embossed in a subsequent operation.

When granulated plastic materials, such as plasticized polymerized vinyl chloride resin-bound compositions, are used in the formation of molded inlaid surface coverings, the mix is difficult to work in regular stencilling equipment, such as disclosed in Berger Patent 2,241,051. The problem is particularly acute with inlaid patterns of fine line and intricate design. The particles do not behave like granulated linoleum composition, and they do not faithfully reproduce the pattern of the stencil openings, but rather tend to slough off at the edges and collapse, creating objectionable defects in the finished product.

Another problem involved in the manufacture of molded inlaid plastic surface coverings is to provide a good, closely knit surface from the granules upon consolidation of the mass under heat and pressure. Smoothness of surface is extremely important, particularly in floor coverings where a rough surface tends to gather and hold dirt.

Granulated plastic compositions of the type having a polymerized vinyl resin binder, such as polymerized vinyl chloride resin, with the usual inorganic filler particles and color pigments give off substantial quantities of dust during conveying, stenciling, and other operations. This is objectionable from a manufacturing standpoint.

An object of the present invention is to provide a process of making molded inlaid surface coverings having good line definition between pattern elements from granulated plastic compositions formed into a wear layer by consolidation of stencilled inlays.

A further object of the invention is to provide a process as described which will result in a better knit surface in the finished product.

An additional object of the invention is to provide a process which will substantially reduce or completely eliminate the dust problem referred to above.

Other objects of the invention will be clear from the following description of an embodiment of the invention which will be described in conjunction with the attached drawing in which the single figure is a diagrammatic view of an apparatus for carrying out the invention.

According to the invention, any plasticized polymerized vinyl resin composition suitable for use as a surface covering is prepared by mixing the plasticized resin as a binder with suitable filler and pigment particles. A number of batches of differently colored compositions generally will be used. For instance, a floral design floor covering pattern may have five or more differently shaped design elements, each of a different color or shade of color. Other patterns may have more or fewer colors.

A typical red colored composition may be made up as follows:

EXAMPLE I

| | Percent by weight |
|---|---|
| Polyvinyl chloride-acetate copolymer resin | 30 |
| Dioctyl-phthalate plasticizer | 10 |
| Ground limestone filler | 52 |
| Barium ricinoleate stabilizer | 1 |
| Red color pigment | 7 |
| | 100 |

The resin selected for use in Example I contains about 95% vinyl chloride and 5% vinyl acetate in the polymerization mixture. Other polymerized vinyl resins may be used as the binder or a substantial part of it, including the resins formed by polymerization of vinyl chloride alone or by copolymerization of vinyl chloride with one or more copolymerizable substances, such as the vinyl acetate mentioned above or vinylidene chloride. Mixtures of resins or one or more resins with synthetic rubber may be used also. The present invention is not concerned with the specific granulated inlaying composition to be treated—it is applicable to all of the polymerized vinyl resin compositions, particularly polymerized vinyl chloride resins, suitable for formation into surface coverings.

The mix is prepared in the usual way by blending the ingredients in an internal mixer or on mixing rolls. Preferred practice is to mix the ingredients in a Banbury mixer, work the mass on mixing rolls, and sheet the material from the rolls as a thin sheet which is cut into small pieces. The batch of pieces is then pulverized or granulated. A comminuting machine, such as a Fitzpatrick mill, may be used in this operation, and the granulated material may be sieved so that the particle size will range from about 14 to 50 mesh, U.S. Standard size.

Similar batches will be prepared for each color in the pattern. In the embodiment illustrated, a pattern of five colors may be formed with the inlaying equipment shown diagrammatically.

The granulated mix after pulverization and screening to the desired size is next coated on its exterior surface with a mixture of fine particles of polymerized vinyl resin dispersed in a material which is a nonsolvent for the resin particles at room temperature but is a good solvent for the particles at an elevated temperature, such as the temperature used in the molding of the inlaid composition in the heated consolidating presses and in the preheaters which supply heat to the granulated material prior to pressing. This type of product is known as a polymerized vinyl resin plastisol. The preferred resin is polymerized vinyl chloride. Equally useful is polymerized vinyl chloride-vinyl acetate resin. Other polymerized resins may be used, and the class of resins mentioned above as the binder for the granulated particles will be suitable, including mixtures of various resins. The plastisol should be compatible with the polymerized vinyl resin used in the granulated composition.

A typical composition for the purpose is a plastisol of the following formula:

*Example II*

| | Parts by weight |
|---|---|
| Polyvinyl chloride resin particles | 125.0 |
| Butylated urea-formaldehyde resin | 2.5 |
| Dioctyl phthalate | 125.0 |

The polyvinyl chloride resin particles may be of .1 micron to 5.0 microns average size, for example. The urea-formaldehyde resin serves principally as a viscosity depressant. Dioctyl phthalate is the preferred nonsolvent fluid component for the particles which becomes a good solvent and serves as a plasticizer for the particles after the fusion temperature of the particles has been reached. In place of dioctyl phthalate, other materials may be used, such as tricresyl phosphate, dibenzyl sebacate, and dibutyl phthalate; and mixtures of various plasticizers may be used.

It is preferred to use about equal parts by weight of resin particles and nonsolvent fluid component, but this is not critical. A material which may be readily distributed over the surface of the granules is preferred to one which requires extensive mixing to obtain good distribution. A good workable range of proportioning of plasticizer to resin is from 35 to 150 parts of plasticizer for each 100 parts of resin.

The quantity of compatible plastisol applied to the granules will vary with the size of the granules, the nature of the surface of the granules, that is smooth or rough, and other variable factors. A quantity in the range of about 0.5% to 10% by weight is a reasonable operating range for most purposes. The plastisol may be applied to the dry granules in a tumbler type mixer.

The following is a typical example of a molded inlaying composition for use in the practice of the invention:

*Example III*

| | Parts by weight |
|---|---|
| Polyvinyl chloride-polyvinyl acetate resin composition of Example I (particle size about 14 to 50 mesh with granules having two smooth calendered surfaces) | 100 |
| Polyvinyl chloride-dioctyl phthalate plastisol of Example II | 2 |

In the preparation of a floor covering from the composition, conventional molded inlaid linoleum equipment may be used, as mentioned above. A typical molded inlaid production line is shown diagrammatically in the drawing.

The backing layer 2, which may be burlap, waterproof felt, rubber-bound asbestos paper, or other foundation material, is fed from a roll over an inlaying table 3. The granulated composition is fed through stencil plates 4 which have openings in the bottom thereof defining the outline of the individual inlays. The stencils are indicated in elevated position in the drawing. After each stenciling operation, the foundation web is moved a distance equal to the effective width of the stencils, and additional granulated composition of other colors or shades of color is applied until the composite inlaid pattern is formed, substantially completely covering the foundation web. The plastisol which is deposited as a very thin coating over the granules substantially modifies the surface characteristics of the granules, and they may be stenciled in fine line and intricate patterns. The dust problem mentioned above which has been an important one in the molded inlaying process of making plastic surface coverings is of no significance with the plastisol coated granules.

The web 2 with the inlays on it passes under a bank of heaters 5 and over a warmed or heated platen 6.

The preheated material passes under a consolidating press 7, the platens 8 and 9 of which are heated to a temperature adequate to fuse the plastisol and to form the granulated inlaying composition into a closely knit sheet under the applied consolidating pressure. The plastisol is completely reactive at the fusion temperature employed and is converted into a solid, nontacky state as a thin coating on each of the granules. This fusion of the plastisol coating is effected in the preheating step where the material is heated to a temperature of about 300° F. to 375° F., prior to pressing, and in the consolidation step where the upper press platen 8 which engages the composition is heated to about 300° F. to 375° F. and a pressure of about 1400 pounds per square inch is applied for a few seconds. The preferred preheating and consolidating temperature is about 325° F. The pressing operation consolidates the inlaid material to the desired thickness and density and causes the granules to form into a closely knit sheet with an improved surface resulting from the plastisol coating on the granules.

The time, temperature, and pressure conditions stated above are for the inlaying composition of Example III. With a more readily soluble resin plastisol, temperatures as low as about 225° F. may be adequate to effect fusion of the plastisol, although a somewhat longer pressing time may be required. Temperatures as high as about 400° F. may be required for the more difficultly soluble resin plastisols. The range of available resins and plasticizers for plastisol formation is quite wide, and there will be no problem of tailoring the plastisol to the particular resin binder used in the inlaying composition.

A web of release paper 10 may be fed under the platen 8 and will serve to prevent adherence of the vinyl granules to the platen in the pressing operation.

If desired, embossing may be effected in press 11 which includes heated platens 12 and 13. A web of press release paper 14 may be used in this press, if found necessary or desirable. Embossing rolls may also be used.

The finished product is withdrawn from the press 11, is cooled by passing the web through a cooling festoon 15, and the cooled product is formed into a roll 16.

By the present invention, the granulated material may be formed into relatively fine line and intricate inlaid patterns, with faithful reproduction of the pattern defined by the stencil openings, a result heretofore sought but not achieved with conventional granulated polyvinyl chloride mixes.

The dust problem heretofore present in the manufacture of molded inlaid plastic surface coverings is eliminated or reduced to the point where it is of no significance.

An improved surface is attained in the final product, and there is no uncombined plasticizer or other material present at the surface which would deleteriously affect the soil resistance properties of the finished product.

I claim:

1. A method of making an inlaid plastic covering from thermoplastic granules including filler particles and a thermoplastic binder comprising plasticized polymerized vinyl resin, the steps comprising coating the exterior surface of said thermoplastic granules with a polymerized vinyl resin plastisol which is compatible with said thermoplastic binder for said granules, depositing said plastisol-coated granules onto a foundation, applying heat and pressure to said granules to activate said thermoplastic binder, to fuse said plastisol, and to join said granules into a coherent body, and thereafter cooling said consolidated product.

2. In a method of making an inlaid plastic covering from thermoplastic granules including filler particles and a thermoplastic binder comprising plasticized polyvinyl chloride resin, the steps comprising coating the exterior surface of said thermoplastic granules with a polyvinyl chloride plastisol, strickling said plastisol-coated thermoplastic granules in separate pattern elements of preformed outline onto a backing to form a complete pattern covering the backing, with sharp lines of demarcation between adjacent pattern elements, and thereafter applying heat and pressure to said inlays to consolidate the granules into a coherent body by activation of said thermoplastic binder and fusion of said plastisol.

3. A method of making an inlaid plastic covering from thermoplastic granules including filler particles and a theremoplastic binder comprising plasticized polyvinyl chloride, the steps comprising coating the exterior surface of said thermoplastic granules with a polyvinyl chloride plastisol which is compatible with said thermoplastic binder for said granules, strickling said plastisol-coated thermoplastic granules in separate pattern elements of preformed outline onto a backing to form a complete pattern covering the backing, with sharp lines of demarcation between adjacent pattern elements, heating said inlays to a temperature above the fusion temperature of said plastisol, consolidating said inlays into a smooth surfaced layer attached to said backing, and thereafter cooling said consolidated product.

4. In a method of making an inlaid plastic covering, the steps of claim 1 in which the granulated inlays on the foundation are heated to a temperature in the range of 225° to 400° F.

5. In a method of making an inlaid plastic covering, the steps of claim 4 in which said heat is applied at least in part by a heated pressing surface which is brought down from above into engagement with said inlays deposited upon said foundation web.

6. In a method of making an inlaid plastic covering from thermoplastic granules including filler particles and a thermoplastic binder comprising plasticized polymerized vinyl resin, which resin is selected from the group consisting of polymerized vinyl chloride and copolymerized vinyl chloride and vinyl acetate, the steps comprising coating the outer surface of said thermoplastic granules with a polymerized vinyl resin plastisol which is compatible with said thermoplastic binder for said granules, depositing said plastisol-coated thermoplastic granules onto a foundation, applying heat and pressure to said plastisol-coated thermoplastic granules to activate said thermoplastic binder, to fuse said plastisol, and to join said granules into a coherent body, and thereafter cooling said consolidated product.

7. In a method of making an inlaid plastic covering from thermoplastic granules including filler particles and a thermoplastic binder comprising plasticized polymerized vinyl resin, the steps comprising coating the outer surface of said thermoplastic granules with a polymerized vinyl resin plastisol in which the resin is selected from the group consisting of polymerized vinyl chloride and copolymerized vinyl chloride and vinyl acetate, depositing said plastisol-coated thermoplastic granules onto a foundation, applying heat and pressure to said plastisol-coated thermoplastic granules to activate said thermoplastic binder, to fuse said plastisol, and to join said granules into a coherent body, and thereafter cooling said consolidated product.

8. In a method of making an inlaid plastic covering from thermoplastic granules including filler particles and a thermoplastic binder comprising plasticized polymerized vinyl resin, which resin is selected from the group consisting of polymerized vinyl chloride and copolymerized vinyl chloride and vinyl acetate, the steps comprising coating the outer surface of said thermoplastic granules with a polymerized vinyl resin plastisol in which the resin is selected from the group consisting of polymerized vinyl chloride and copolymerized vinyl chloride and vinyl acetate, depositing said plastisol-coated thermoplastic granules onto a foundation, applying heat and pressure to said plastisol-coated thermoplastic granules to activate said binder, to fuse said plastisol, and to join said granules into a coherent body, and thereafter cooling said consolidated product.

9. In a method of making an inlaid plastic covering from thermoplastic granules including filler particles and a thermoplastic binder comprising polymerized vinyl chloride-vinyl acetate resin, the steps comprising coating the outer surface of said thermoplastic granules with a polymerized vinyl chloride resin plastisol, depositing said plastisol-coated thermoplastic granules onto a foundation, preheating said plastisol-coated thermoplastic granules to a temperature in the order of 300° F. to 375° F. to fuse said plastisol and render it nontacky, thereafter consolidating the thermoplastic granules under heat and pressure, and cooling said consolidated product.

10. In a method of making an inlaid plastic covering from thermoplastic granules including filler particles and a thermoplastic binder comprising polymerized vinyl chloride-vinyl acetate resin, the steps comprising coating the outer surface of said thermoplastic granules by applying thereto .5% to 10%, based on the weight of the granules, of a polymerized vinyl chloride resin plastisol, depositing said plastisol-coated thermoplastic granules onto a foundation, preheating said plastisol-coated thermoplastic granules to a temperature in the order of 300° F. to 375° F. to fuse said plastisol and render it nontacky, thereafter consolidating the thermoplastic granules under heat and pressure by applying a pressing surface thereto heated to a temperature in the order of 300° F. to 375° F., and cooling said consolidated product.

11. In a method of making an inlaid plastic covering from thermoplastic granules, the steps comprising forming a mass of solid thermoplastic granules including filler particles and a thermoplastic binder comprising a vinyl chloride polymerization product, applying to the surface of said granules a vinyl chloride plastisol in the form of a dispersion of fine solid particles of a vinyl chloride polymerization product in a liquid plasticizer which is a nonsolvent for the particles at room temperature but is a good solvent for the particles at a temperature in the order of 300° F. to 375° F., said dispersion being fusible into a solid, nontacky state at said elevated temperatures, mixing said granules and dispersion to distribute said dispersion over the surface of said granules as a thin coating, depositing said mass of coated granules onto a foundation, applying heat and pressure to said mass of coated granules to elevate the same to a temperature in said elevated temperature range of 300° F. to 375° F. to convert said dispersion into a solid, nontacky state and to join said granules together into a coherent body by said thermoplastic binder, and thereafter cooling said consolidated product.

12. A method of making a decorative plastic surface covering from thermoplastic granules including filler particles and a thermoplastic binder comprising plasticized vinyl resin, which comprises coating the surface of said granules with a vinyl resin plastisol which is compatible with said binder, heating said liquid coated granules to convert said coating to a nonflowable state and thereafter applying heat and pressure to consolidate said granules into a smooth, uniform sheet of fused composition.

References Cited

UNITED STATES PATENTS

| 1,793,667 | 2/1931 | Baldwin | 154—25 |
| 2,631,643 | 3/1953 | Schueler | 154—25 X |
| 2,636,542 | 4/1953 | Humphreys | 154—49 X |
| 2,775,994 | 1/1957 | Rowe | 154—25 X |
| 2,917,472 | 12/1959 | Smith | 260—2.5 |

FOREIGN PATENTS 675,663  7/1952  Great Britain.

JACOB H. STEINBERG, *Primary Examiner.*

CARL F. KRAFFT, R. LIEBOWITZ, *Examiners.*

A. H. BERNSTEIN, M. Q. TATLOW,
*Assistant Examiners.*